US009873324B2

(12) United States Patent
Pichan

(10) Patent No.: US 9,873,324 B2
(45) Date of Patent: Jan. 23, 2018

(54) INTEGRATED FUEL STATION

(71) Applicant: David L. Pichan, Ypsilanti, MI (US)

(72) Inventor: David L. Pichan, Ypsilanti, MI (US)

( * ) Notice: Subject to any disclaimer, the term of this patent is extended or adjusted under 35 U.S.C. 154(b) by 0 days.

(21) Appl. No.: 14/990,493

(22) Filed: Jan. 7, 2016

(65) Prior Publication Data

US 2016/0194194 A1 Jul. 7, 2016

Related U.S. Application Data

(60) Provisional application No. 62/100,821, filed on Jan. 7, 2015.

(51) Int. Cl.
| | | |
|---|---|---|
| *B60K 15/01* | (2006.01) |
| *B60K 15/077* | (2006.01) |
| *B60K 15/03* | (2006.01) |
| *B60K 15/035* | (2006.01) |
| *B60K 15/04* | (2006.01) |

(52) U.S. Cl.
CPC ............ *B60K 15/077* (2013.01); *B60K 15/01* (2013.01); *B60K 15/0406* (2013.01); *B60K 2015/03243* (2013.01); *B60K 2015/03473* (2013.01); *B60K 2015/03547* (2013.01); *B60K 2015/0438* (2013.01)

(58) Field of Classification Search
CPC .. B60K 15/077; B60K 15/01; B60K 15/0406; B60K 2015/03547; B60K 2015/03243; B60K 2015/0438; B60K 2015/03473
USPC ................ 141/98, 231, 392; 123/1 R, 198 C
See application file for complete search history.

(56) References Cited

U.S. PATENT DOCUMENTS

| | | | |
|---|---|---|---|
| 3,774,654 A * | 11/1973 | Hjermstad ............. | B60K 15/06 137/433 |
| 5,718,260 A | 2/1998 | Leonardi | |
| 6,056,028 A * | 5/2000 | Crawford ................ | F02B 77/00 123/198 R |
| 6,167,903 B1 | 1/2001 | Newman | |
| 6,176,279 B1 * | 1/2001 | Dahlin ................... | B61K 11/00 137/234.6 |
| 6,938,612 B2 | 9/2005 | Porter | |
| 7,025,082 B1 * | 4/2006 | Wood ....................... | B62J 37/00 123/198 C |
| 8,695,645 B2 * | 4/2014 | McAvey ................. | B60K 15/00 137/351 |
| 9,139,082 B2 * | 9/2015 | Paolucci ................. | B60K 15/00 |
| 9,188,092 B2 * | 11/2015 | McAvey ............ | F02M 37/0088 |
| 2005/0279406 A1 * | 12/2005 | Atwood ............... | B60K 15/035 137/39 |
| 2009/0044866 A1 * | 2/2009 | Pearson ................. | F02M 37/18 137/87.01 |
| 2011/0036428 A1 | 2/2011 | Lynn | |
| 2011/0168724 A1 | 7/2011 | Bruinius | |

FOREIGN PATENT DOCUMENTS

| | | |
|---|---|---|
| DE | 196006020 | 8/1997 |
| GB | 2295362 | 5/1996 |

* cited by examiner

*Primary Examiner* — Nicholas A Arnett
(74) *Attorney, Agent, or Firm* — Vincent Re PLLC

(57) ABSTRACT

A fuel dispensing system is disclosed to be equipped to a vehicle and to dispense fuel from the vehicle. The system includes a fuel tank, a selectively activated dispensing pump, a retractable flexible fuel line connected to the pump enabling storage of the fuel line within a body of the vehicle, and a dispensing nozzle attached to the fuel line.

11 Claims, 5 Drawing Sheets

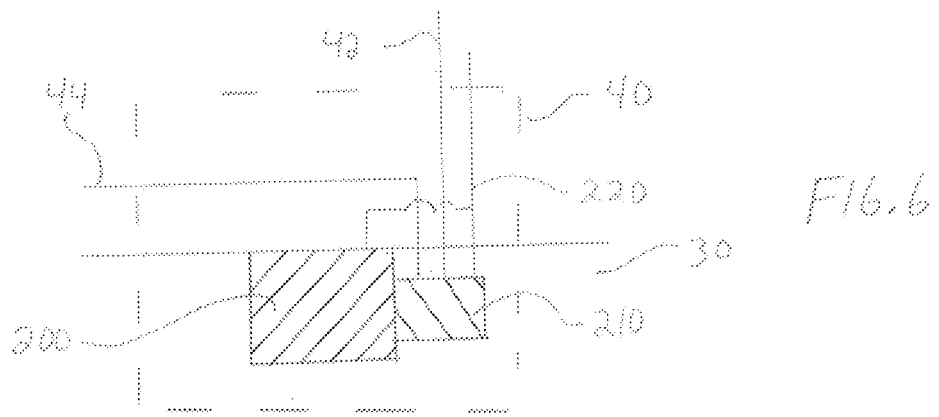
FIG. 6
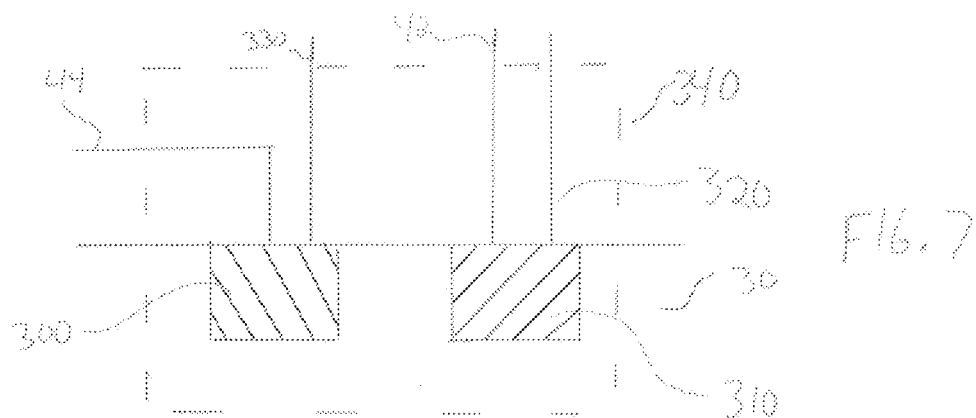
FIG. 7
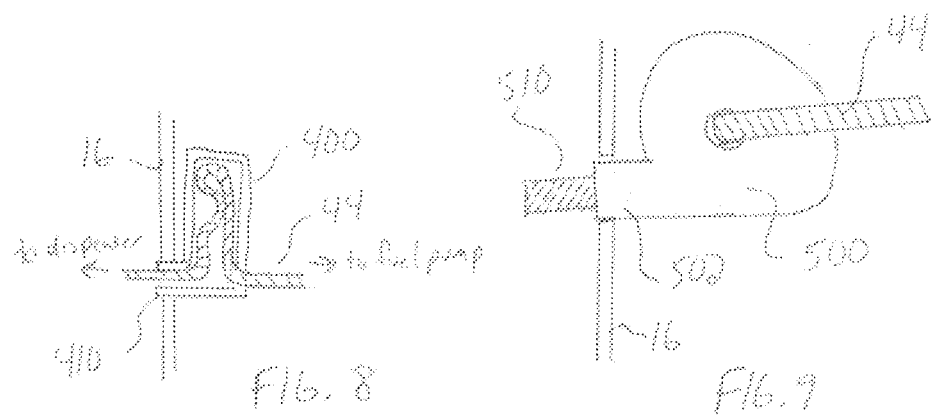
FIG. 8
FIG. 9

INTEGRATED FUEL STATION

CROSS REFERENCE TO RELATED APPLICATIONS

This disclosure claims the benefit of U.S. Provisional Application No. 62/100,821, filed on Jan. 7, 2015, which is hereby incorporated by reference.

TECHNICAL FIELD

This disclosure is related to a vehicular system for dispensing fuel. In particular, the disclosure is related to a system for dispensing fuel from a fuel tank of a vehicle to a proximate fuel container or to a modular auxiliary fuel consuming system.

BACKGROUND

The statements in this section merely provide background information related to the present disclosure. Accordingly, such statements are not intended to constitute an admission of prior art.

Vehicles store fuel in a fuel tank. People also need fuel for other devices such as lawn mowers, boats, recreational vehicles, etc. According to one known method, a person can purchase an approved container for transporting fuel (typically a one gallon or similar container) and shuttle the container to and from a gas station to acquire and transport fuel. The fuel container is then situated to a tank of the device being fueled and is tipped up to allow gravity to feed the fuel into the device. Such a system includes likely spillage, exposure of the user to fumes and splashing, and can be a hazard in the event of a wreck.

SUMMARY

A fuel dispensing system is disclosed to be equipped to a vehicle and to dispense fuel from the vehicle. The system includes a fuel tank, a selectively activated dispensing pump, a retractable flexible fuel line connected to the pump enabling storage of the fuel line within a body of the vehicle, and a dispensing nozzle attached to the fuel line.

BRIEF DESCRIPTION OF THE DRAWINGS

One or more embodiments will now be described, by way of example, with reference to the accompanying drawings, in which:

FIG. 6 illustrates an exemplary fuel pumping system comprising a fuel pump and a diverter valve configured to direct a fuel flow to an engine or to a dispenser nozzle, in accordance with the present disclosure;

FIG. 7 illustrates an exemplary fuel pumping system comprising a primary fuel pump delivering fuel to the engine and a secondary fuel pump delivering fuel to a dispenser nozzle, in accordance with the present disclosure;

FIG. 8 illustrates an exemplary retractable fuel line for use with a dispenser nozzle, with the fuel line being looped within a storage cavity within the vehicle, in accordance with the present disclosure;

FIG. 9 illustrates an exemplary retractable fuel line for use with a dispenser nozzle, wherein the fuel line is stored within a rotary spring device configured to wind up the fuel line within the device, in accordance with the present disclosure;

DETAILED DESCRIPTION

Figure 1:
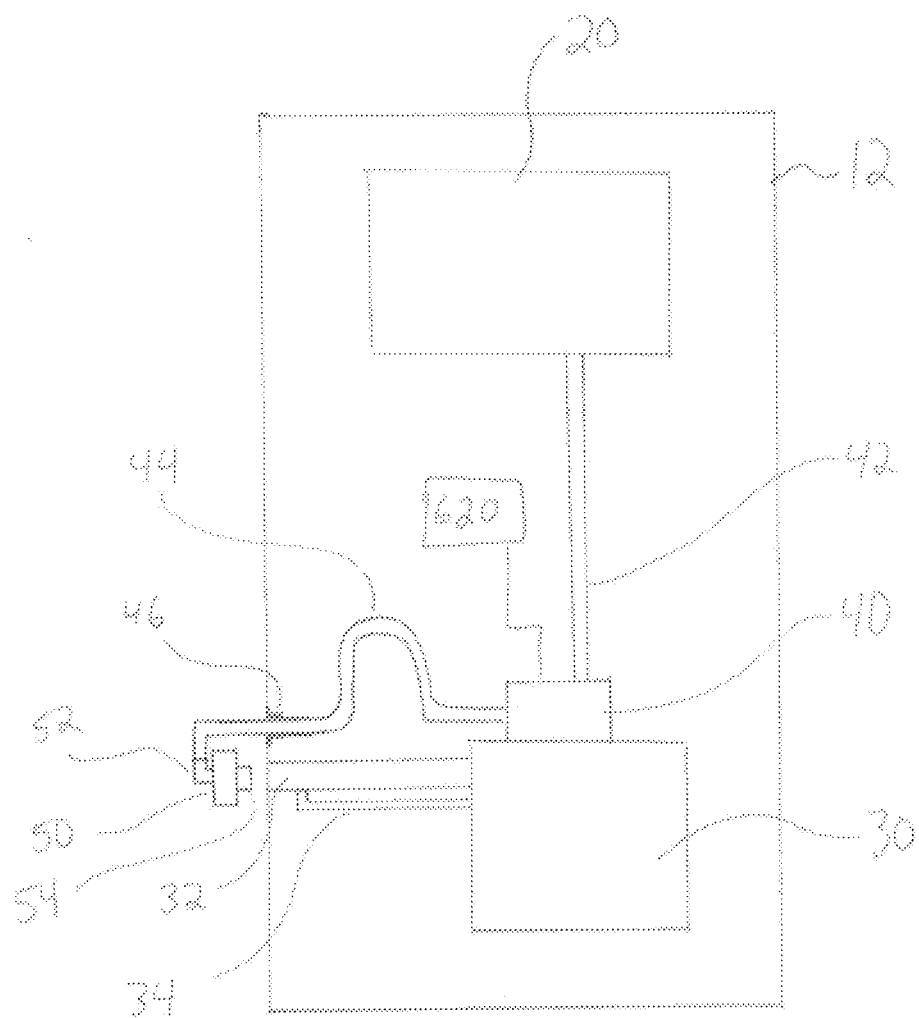
FIG. 1 illustrates an exemplary vehicle equipped with the disclosed fuel dispensing system, in accordance with the present disclosure.

A system is disclosed for dispensing fuel from a main fuel tank of a vehicle to another vehicle or device. The user can use his vehicle as a mobile gas container, filling the vehicle tank at a gas station and then using the vehicle to fill other vehicles or devices as needed. In another embodiment, the disclosed system can provide a universal fuel hookup for a modular auxiliary fuel consuming system.

A directional or diverting valve can be located with a gas tank of a vehicle. Such a valve can be integrated with the fuel pump or attached directly to the fuel pump. In another embodiment, the fuel pump can be located outside of the tank inline with the gas line leading to the engine.

A fuel filling hose or line can be coiled or collapsible hose that can be stored in a tube. At the end of the outlet side of the hose, the hose can have a female petroleum compatible quick connect coupler configured to disconnect and connect easily with a port located on the vehicle. In another embodiment, the hose can instead have a male petroleum compatible quick connect coupler similarly configured to connect and disconnect to a port. The other end of the hose can have any known petroleum dispensing valve or nozzle capable of being fitted to a fuel can or fuel tank opening as known in the art.

According to one embodiment, a plastic molded container can be fitted to the vehicle in which the fuel filling hose can be coiled and stored. Such a container can be located anywhere in the vehicle for easy access. According to one embodiment, the container opens to the exterior of the vehicle to avoid fumes reaching the driver and occupants of the vehicle. Such a container could be fastened or attached to the vehicle near a spare tire. Upon a typical pick-up truck, such a container could be affixed to or installed to project within a back wall of the cab behind where the seats are.

Storing fuel in the fuel tank of a vehicle is inherently safer than storing fuel in a hand-held container either in the vehicle or stored in a trunk or in the bed of a truck. Spillage, fumes, and possible ignition are all concerns with a hand-held fuel container which are eliminated when fuel is stored properly within the tank of the vehicle. Further, larger amounts of fuel can be transferred. A large vehicle such as a recreational vehicle can consumer considerable fuel simply driving down the street to top off the fuel tank. It can be considerably more efficient and convenient to drive small vehicle to the gas station, acquire a full tank, and dispense nearly the full tank to the recreational vehicle instead of driving the large vehicle to the station.

Even when used properly, filling a hand-held container at a gas station creates inherent static electricity risk of ignition during the filling event. Such a risk is greatly reduced by simply filling the vehicle and dispensing the fuel from the vehicle.

Computerized or electronic control of fuel pump the fuel system or an auxiliary pump used to dispense the fuel as disclosed can enhance safety of the disclosed fuel dispensing system. For example, the fuel dispensing system can be selectively enabled only when the vehicle is in park. In another example, the fuel dispensing system can be selectively enabled only when the vehicle is in off and the key is turned in the accessory mode. In another example, the fuel dispensing system can be selectively enabled only when a timed fuel dispenser mode (for example, a button activated mode) is activated upon the dash board, and the system will only start pumping if the fuel system is activated within a set time of the activation of the mode, thereby requiring one button to be pressed on the dash sequentially in a limited time with a dispenser on button located at the dispenser station outside of the vehicle. According to one embodiment, a dispenser on button can be active for a certain time or can be permitted only one on indication per fuel dispensing mode to require intentional operation by the user.

FIG. 1 illustrates an exemplary vehicle equipped with the disclosed fuel dispensing system. Vehicle 12 is illustrated in outline including engine 20, fuel tank 30, fuel pumping system 40, fuel dispensing hose 44, and a fuel dispensing nozzle 54. Engine 20 is a complex mechanical system known in the art including an internal combustion engine consuming fuel to produce an output torque useful to provide motive force to the vehicle. Fuel tank 30 is a device known in the art for storing and providing fuel to onboard systems such as the engine and is filled through fill tube 32. Vent line 34 is known in the art to facilitate filling through tube 32. Fuel pumping system 40 includes one or more fuel pumps for removing fuel from the tank.

Fuel dispensing control module 620 is provided controlling operation of fuel pumping system 40. Fuel dispensing control module 620 includes programmed logic preventing accidental or unauthorized dispensing of fuel.

Fuel line 42 provides fuel from fuel pumping system 40 to the engine under normal operation. Fuel dispensing line 44 of FIG. 1 includes a retractable, flexible fuel line configured to be stored within the vehicle when not in use. In other embodiments, a detachable flexible fuel dispensing line can be attached outside of the vehicle to a quick connect fitting provided on the outside of the vehicle. Fuel dispensing line 44 projects through an outer surface of the vehicle through an orifice 46. Orifice 46 can include rounded or plastic trim features configured to permit the fuel line to be extended and retracted without damaging the fuel line.

Fuel dispensing nozzles according to the present disclosure can take any of a number of forms. Nozzles can include an activation button or lever attached to the nozzle, wherein the button or lever is electronically connected to the control module 620. In the embodiment of FIG. 1, dispensing nozzle 54 is integrated with fuel cap 50. An optional ninety degree swivel connection 52 known in the art for fluid connections is provided upon cap 50 connecting nozzle 54 to fuel line 44. Cap 50 is configured to be screwed into or twistingly attached to fill tube 32 when the vehicle is in normal operation. By integrating the nozzle 54 with cap 50, spillage, accidental dispensing, activation caused by a crash, or other fuel flow through the nozzle is automatically channeled directly back into fill tube 32 and into tank 30. When the user intends to fill another container with fuel, the user can unscrew cap 50 from tube 32, extend the fuel line 44 from the vehicle, attach cap 50 to the other container, and activate the dispensing system.

The dispensing fuel line 44 is illustrated as a flexible line attached directly to the fuel pumping system. It will be appreciated that in all embodiments disclosed herein hard fuel lines can be used from the fuel pumping system to some point closer to the area where the flexible line will be stored, and the flexible line can be attached to the hard line.

Figure 2:
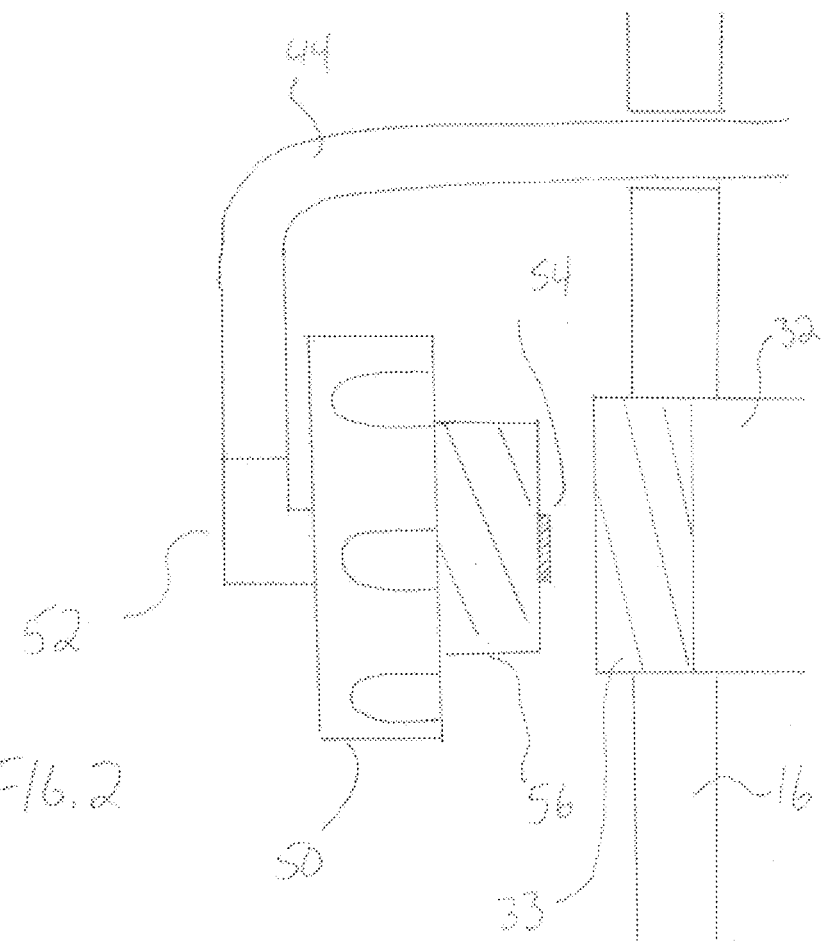
FIG. 2 illustrates an exemplary dispenser nozzle equipped upon a fuel cap, in accordance with the present disclosure.

FIG. 2 illustrates an exemplary dispenser nozzle equipped upon a fuel cap. Fuel cap 50 is illustrated including threaded section 56 configured to be tightened and secured within threaded section 33 of fill tube 32. Fill tube 32 includes valving mechanisms known in the art used to receive the dispensing nozzle at a gas station. Fill tube 32 and fuel line 44 extend through outer body 16 of the vehicle. Cap 50 includes fuel dispensing nozzle 54 projecting through cap 50. Nozzle 54 is connected to fuel line 44, such that fuel pumped through line 44 can be dispensed through nozzle 54. An optional ninety degree swivel connection 52 is illustrated, connecting line 44 to nozzle 54.

Figure 3:
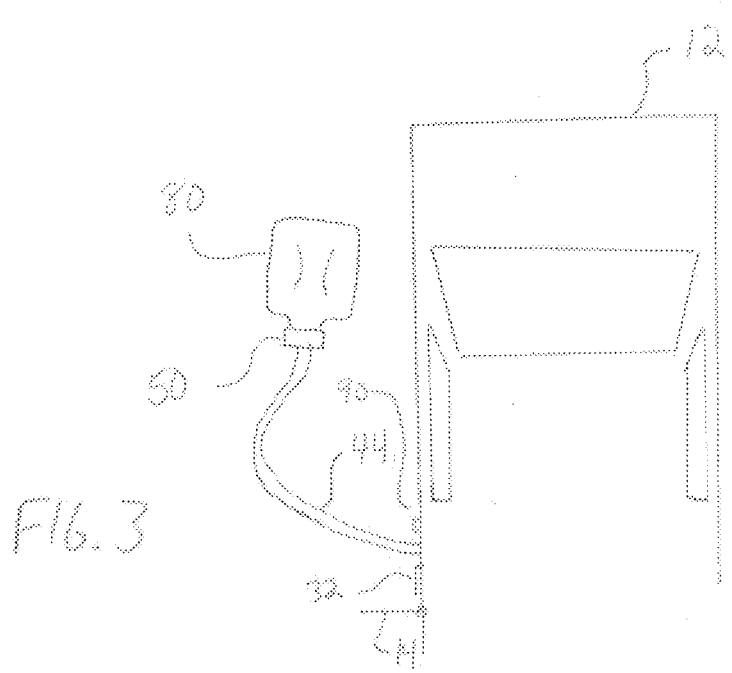
FIG. 3 illustrates the exemplary dispenser nozzle and fuel cap system of FIG. 2 being utilized to dispense fuel into a fuel container, in accordance with the present disclosure.

FIG. 3 illustrates the exemplary dispenser nozzle and fuel cap system of FIG. 2 being utilized to dispense fuel into a fuel container. Vehicle 12 is illustrated including fuel line 44 extended from vehicle 12, such that cap 50 can be fastened to a mobile fuel container 80. Fuel dispensing system activation button 90 is illustrated proximate to the point where the fuel line extends from the vehicle body. Fill tube 32 is illustrated, ready to again receive cap 50 once the dispensing operation is complete. Fuel door 14 is illustrated attached to the body of vehicle 12. Door 14 can be configured to close over the cap 50 when fastened to fill tube 32, line 44, and/or button 90.

Figure 4:
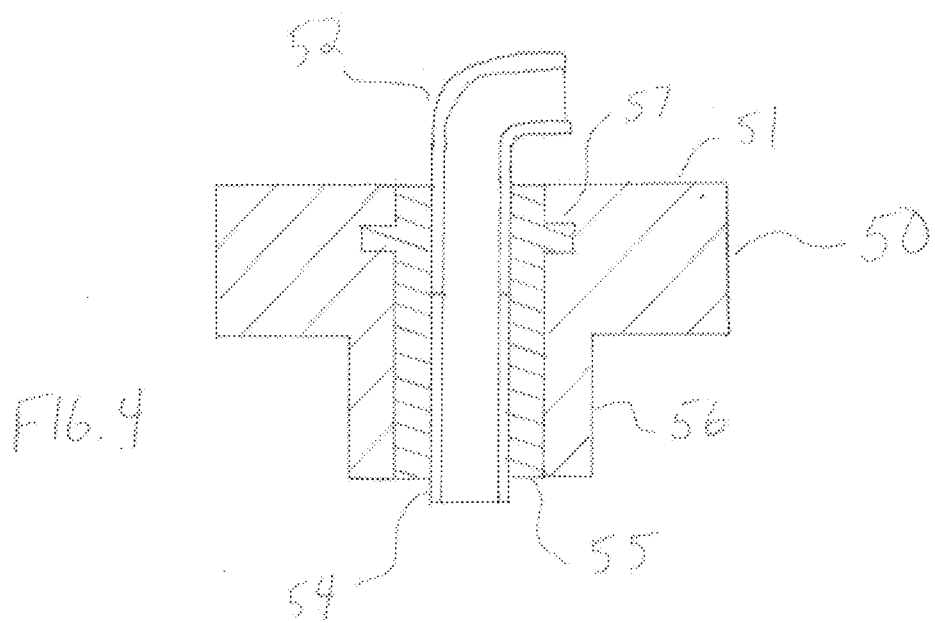
FIG. 4 illustrates in cross section the dispenser nozzle and fuel cap of FIG. 2, in accordance with the present disclosure.

FIG. 4 illustrates in cross section the dispenser nozzle and fuel cap of FIG. 2. Flue cap 50 is illustrated including threaded section 56. Swivel connection 42 is illustrated connected to nozzle 54 within cap 50. A carrier structure 55 is illustrated surrounding the nozzle 54 and swivel 52 within cap 50. Carrier structure 55 includes tongue structure 57 configured to fit within a mating groove upon cap 50 such that cap 50 can rotate relative to carrier structure 55. In this way, cap 50 can be affixed to and loosened from a mating connection while the nozzle 54 and an attached fuel line do not have to spin. A space can be left between carrier structure 55 and cap 50 or between carrier structure 55 and nozzle 54 such that a venting of the fuel tank common to fuel caps can be accomplished when cap 50 is attached to a mating fill tube in normal operation of a vehicle. In one embodiment, a vent can be created by creating a longitudinal groove on the outside surface of nozzle 54 and swivel 52. Such a vent can additionally aid in permitting nozzle 54 to quickly fill an otherwise unvented container.

Figure 5:
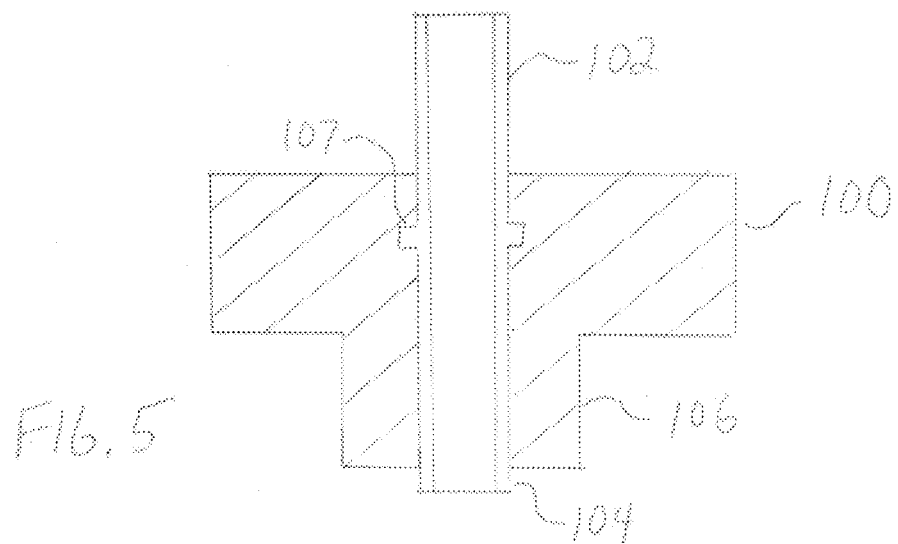
FIG. 5 illustrates in cross section an additional exemplary embodiment of a dispenser nozzle combined with a fuel cap, in accordance with the present disclosure.

FIG. 5 illustrates in cross section an additional exemplary embodiment of a dispenser nozzle combined with a fuel cap. Fuel cap 100 is provided as an alternative to cap 50, with cap 100 including threaded section 106 and with nozzle 104 including a straight connection section 102 configured to be attached to a flexible fuel line and with tongue structure 107 fitting within a mating groove on cap 100.

The cross sections of FIG. 4 and FIG. 5 are intended to illustrate general positions of features within a combined fuel cap and fuel dispensing nozzle. It will be understood that actual coupling devices and structures used in fuel lines known in the art will be employed to accomplish the illustrated part functions.

FIG. 6 illustrates an exemplary fuel pumping system comprising a fuel pump and a diverter valve configured to direct a fuel flow to an engine or to a dispenser nozzle. Fuel pumping system 40 is illustrated, including fuel pump 200, diverter valve 210, engine fuel line 42, and fuel dispensing line 44. Fuel pump 200 and valve 210 are illustrated directly connected to each other within fuel tank 30, although in other embodiments, the valve 210 can be located separated from the pump and/or outside of the fuel tank. Under preferred operation, fuel is pumped to an engine at a significantly slower rate than fuel is dispensed from a typical fuel dispenser nozzle. Diverter valve can include internal orifices that provide different fuel flow rates to fuel line 42 and line 44. Control bus wiring 220 is provided in communication with both fuel pump 200 and diverter valve 210, such that operation of the pump and the valve can be controlled.

FIG. 7 illustrates an exemplary fuel pumping system comprising a primary fuel pump delivering fuel to the engine and a secondary fuel pump delivering fuel to a dispenser nozzle. Fuel pumping system 340 is illustrated as an alternative to fuel pumping system 40, including primary fuel pump 310 connected to engine fuel line 42 and secondary fuel pump 300 connected to fuel dispensing line 44. Fuel pump 300 and fuel pump 310 can be sized and powered differently, based upon directed flow rates and line pressures for fuel line 42 and line 44. Control bus wiring 320 and 330 are provided for electronic control of both fuel pumps 310 and 300, respectively.

FIG. 8 illustrates an exemplary retractable fuel line for use with a dispenser nozzle, with the fuel line being looped within a storage cavity within the vehicle. Outer body 16 of the vehicle is illustrated. Storage cavity 400 is illustrated, for example, including a plastic molded box. Cavity 400 includes a portion 410 with a hole extending through body 16 acting as an orifice through which fuel line 44 can be extended. Fuel line 44 connects through another hole in cavity 400 to extend to a connection with a fuel pump and/or diverting valve. Fuel dispensing line 44 can selectively be pulled/extended from cavity 400 or coiled within cavity 400.

FIG. 9 illustrates an exemplary retractable fuel line for use with a dispenser nozzle, wherein the fuel line is stored within a rotary spring device configured to wind up the fuel line within the device. Rotary spring device 500 is illustrated, including a length of fuel line 510 coiled within device 500. Portion 502 of device 500 extends through outer body 16. A rotary spring within device 500 permits a user to selectively extend, lock in place, and retract the line 510. Similar rotary spring devices are used, for example, to suspend pneumatic air tool devices. Fuel line 44 is attached to device 500 to supply it with fuel flow to be dispensed through a nozzle attached to line 510.

Figure 10:
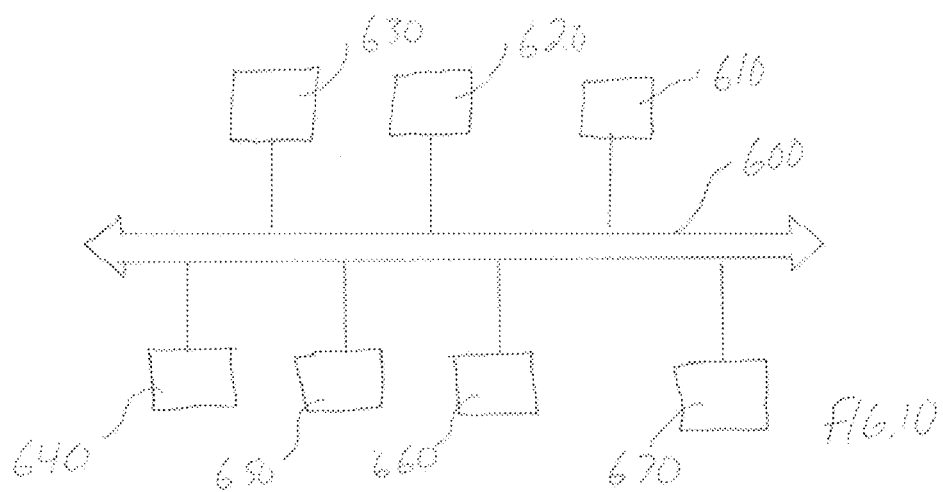
FIG. 10 illustrates an exemplary control system for a fuel dispensing system, in accordance with the present disclosure.

FIG. 10 illustrates an exemplary control system for a fuel dispensing system. Vehicle bus system 600 is provided, including an electronic bus or wiring system configured to communicatively connect various electronic devices within the vehicle. Engine control module 610 is provided monitoring and controlling operation of the engine and vital systems necessary for normal operation of the vehicle. Engine control module 610 can provide for control of a fuel pump required to supply fuel flow to the engine. Fuel dispensing control module 620 is provided, monitoring various factors enabling or disabling operation of the fuel dispensing system and providing for control of fuel pumps and diverter valves as necessary to operate the fuel dispensing system. Crash sensor 630 provides an input to module 620 permitting the module to only enable dispensing of fuel when the crash sensor affirmatively signals that no crash has been detected. Ignition module 640 is illustrated, monitoring the ignition setting of the key in the ignition of the vehicle and providing a signal to module 620, for example, permitting the module to enable dispensing of fuel only when the ignition is set to an accessory mode. Fuel dispensing system activation button module 650 monitors activation of an activation button, for example, located on a dispensing nozzle or on the vehicle body near where the fuel line extends from the vehicle body. Module 650 provides a signal to module 620, permitting module 620 to start and stop fuel flow to the dispenser nozzle upon command from the user. Units 660 and 670 can represent either two fuel pumps, one fuel pump and a diverter valve, or any other equivalent equipment necessary to control the fuel dispensing system.

According to the disclosure, a control module can include a computerized device or a plurality of devices configured to operate computer programming. Such modules typically include computerize components known in the art including a processor, RAM memory, and data storage on a device such as flash memory or a hard drive. Any number of computerized devices and configurations known in the art can be used to operate computer code and/or programming according to the disclosure.

A button, switch, or lever can be used to activate the fuel dispensing system. Other inputs can be gathered, for example, employing a fuel line pressure sensor to deactivate fuel dispensing when a connected container gets close to being full, as is commonly used on fuel station pumps.

Modular auxiliary fuel consuming systems are known, for example, providing a heating element for a rug cleaning attachment on a truck or power to an industrial vacuum device. The system provided herein can be similarly used to provide a truck or other vehicle capable of easily receiving different modules requiring fuel from the truck. The activation button provided herein can be replaced or augmented with an electronic connection permitting control of the fuel flow from the modular device. The nozzle disclosed herein can be replaced with a quick connect fitting connecting to an input hose on the module device.

Exemplary embodiments of a fuel dispensing system are provided. A number of additional or alternative exemplary systems are envisioned, and the disclosure is not intended to be limited to the examples provided herein.

Figure 11:
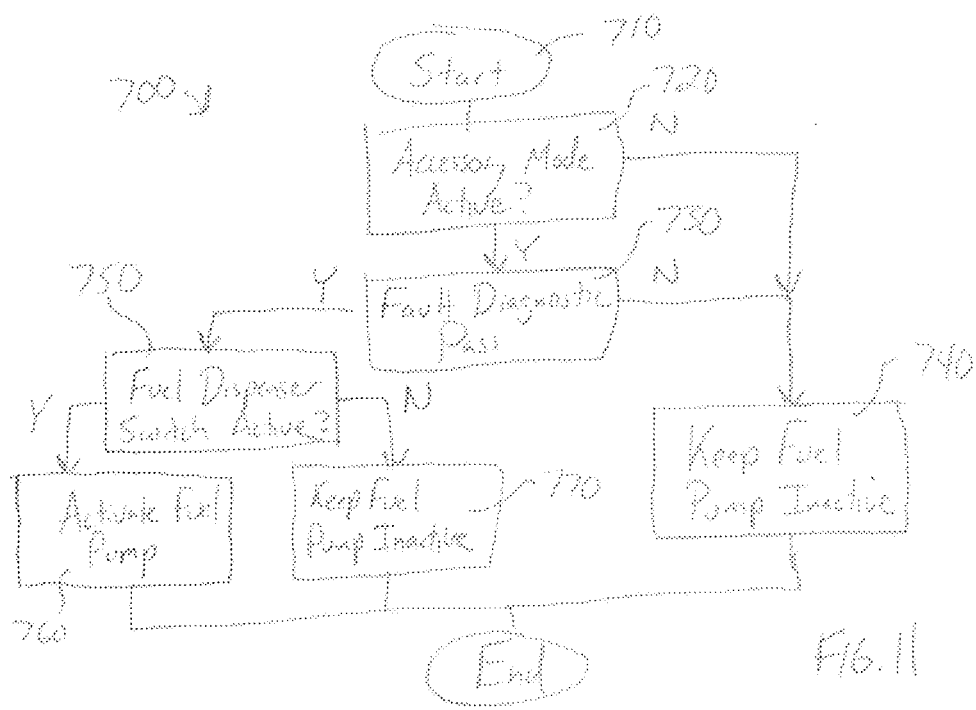
FIG. 11 illustrates an exemplary flow chart illustrating computerized control of a fuel dispensing system, in accordance with the present disclosure.

FIG. 11 illustrates an exemplary flow chart illustrating computerized control of a fuel dispensing system. Process 700 starts at step 710. At step 720, the process determines whether the vehicle ignition has been set to activate an accessory mode. If the mode has not been activated, the fuel pump is kept inactive at step 740. If the mode has been activated, the system checks at step 730 whether a fault diagnostic has been passed. Such a fault diagnostic can look at a crash sensor input, can compare a vehicle tank fuel level a critically low fuel tank level, can require an authorization code from an input device in the vehicle cabin, or can monitor other inputs to failsafe whether dispensing of fuel is proper. If the fault diagnostic fails to pass, the fuel pump is kept inactive at step 740. If the fault diagnostic passes, the process checks at step 750 to see if the fuel dispenser switch or button has been activated. If the button has not been activated, the fuel pump is kept active at step 770. If the switch or button has been activated, the fuel pump is activated at step 760. Different portions of process 700 can be reiterated, for example, with the system checking constantly in cycles to see if the dispenser switch remains activated. In one embodiment, the accessory mode can "time out" after 5 minutes, requiring the user to reactivate the accessory mode before other portions of the process can be repeated. A number of similar processes are envisioned, and the disclosure is not intended to be limited to the particular examples provided herein.

Computerized control of the system can be used to provide other functionality. For example, to improve electrical grounding of the dispensing vehicle, the system can include a motorized electrical wire or chain that can be lowered to the ground prior to pumping fuel to improve the chances that the vehicle has no static charge as compared to ground. The system can include an electrical plug and some length of wire, and may be programmed to require that the plug be plugged in to take advantage of the ground supplied through the electrical connection. A number of related function as envisioned, and the disclosure is not intended to be limited to the examples provided herein.

The disclosed system can be operated by courtesy help vehicles operated by a municipality or by tow trucks. The disclosed system permits a user to provide fresh fuel for a variety of fuel consuming power tools instead of requiring use of stale fuel that has sat around for a season from a hand-held container. The disclosed system saves the user from having to make special trips to the gas station every time a one gallon hand-held container is emptied, thereby saving time and operating time for the vehicle. The disclosed system would be useful for contractors coordinating a construction team, farmers using tractors and other large vehicles, service or trucking companies maintaining fleets of vehicles, and other similar fields.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A fuel dispensing system equipped to a vehicle dispensing fuel from the vehicle, the system comprising:
    a fuel tank;
    a fill tube for the fuel tank;
    a fuel cap configured to seal the fill tube during driving of the vehicle;
    a selectively activated dispensing pump;
    a retractable flexible fuel line connected to the pump enabling storage of the fuel line within a body of the vehicle, wherein the retractable fuel line connects to and through the fuel cap and wherein the fuel cap forms a dispensing nozzle for the fuel.

2. The fuel dispensing system of claim 1, wherein the fuel cap can rotate relative to the retractable flexible fuel line.

3. The fuel dispensing system of claim 1, wherein the fuel cap is configured to be attached to a fuel container proximate to the vehicle.

4. The fuel dispensing system of claim 1, further comprising a storage cavity located within the body of the vehicle, wherein the storage cavity includes an orifice through which the fuel line extends.

5. The fuel dispensing system of claim 1, further comprising a rotary spring device selectively coiling the fuel line within the vehicle and extending the fuel line from the vehicle for dispensing the fuel.

6. The fuel dispensing system of claim 1, wherein the dispensing pump comprises a secondary fuel pump; and
    further comprising a primary fuel pump for fueling an engine of the vehicle.

7. The fuel dispensing system of claim 1, further comprising a diverter valve configured to selectively direct fuel from the dispensing pump to the dispensing nozzle and to an engine of the vehicle.

8. The fuel dispensing system of claim 1, further comprising a fuel dispensing system control module, including programming configured to selectively enable operation of the dispensing pump.

9. The fuel dispensing system of claim 8, wherein the selectively enabled operation is based upon an ignition setting.

10. The fuel dispensing system of claim 8, wherein the selectively enabled operation is based upon a pass indication from a crash sensor.

11. The fuel dispensing system of claim 8, wherein the selectively enabled operation is based upon a minimum fuel tank level.

* * * * *